(12) United States Patent
Xu et al.

(10) Patent No.: US 10,593,057 B2
(45) Date of Patent: Mar. 17, 2020

(54) TOUCHLESS WOUND MEASUREMENT, WOUND VOLUME MEASUREMENT, AND OTHER WOUND MEASUREMENT

(71) Applicant: DermaGenesis LLC, Pompano Beach, FL (US)

(72) Inventors: Tianning Xu, Atlanta, GA (US); Ran Cohen, Petah Tikva (IL); Alexander Steinberg, Ra'anana (IL)

(73) Assignee: DERMAGENESIS, LLC, Pompano Beach, FL (US)

( * ) Notice: Subject to any disclaimer, the term of this patent is extended or adjusted under 35 U.S.C. 154(b) by 249 days.

(21) Appl. No.: 15/850,558

(22) Filed: Dec. 21, 2017

(65) Prior Publication Data
US 2018/0182121 A1    Jun. 28, 2018

Related U.S. Application Data

(60) Provisional application No. 62/438,115, filed on Dec. 22, 2016.

(51) Int. Cl.
*G06T 7/62* (2017.01)
*G06T 7/13* (2017.01)

(52) U.S. Cl.
CPC .................. *G06T 7/62* (2017.01); *G06T 7/13* (2017.01); *G06T 2207/10012* (2013.01); *G06T 2207/10028* (2013.01); *G06T 2207/30088* (2013.01); *G06T 2207/30096* (2013.01)

(58) Field of Classification Search
CPC ... G06T 7/62; G06T 7/13; G06T 2207/10028; G06T 2207/30088; G06T 2207/30096; G06T 2207/10012
See application file for complete search history.

(56) References Cited

U.S. PATENT DOCUMENTS

| | | |
|---|---|---|
| 2008/0226151 A1 | 9/2008 | Zouridakis |
| 2014/0036054 A1 | 2/2014 | Zouridakis |
| 2014/0088402 A1 | 3/2014 | Xu |
| 2014/0376821 A1* | 12/2014 | Meir ................... G01S 17/50 382/218 |
| 2015/0150490 A1 | 6/2015 | Xu |
| 2015/0169983 A1* | 6/2015 | Kang ................. G06K 9/4676 382/154 |
| 2015/0199018 A1* | 7/2015 | Kim ................... G06F 3/017 345/156 |
| 2016/0016363 A1 | 1/2016 | Smith et al. |

OTHER PUBLICATIONS

"A Fast Level Set Model for Intensity Inhomogeneity Correction in eHealth Analysis System", ieeecplore.ieee.org, WEB.
(Continued)

*Primary Examiner* — Siamak Harandi
(74) *Attorney, Agent, or Firm* — W & C IP (57) ABSTRACT

With the inventive technology, wound measurement is performed, but without the patient wound, or the skin near the patient wound, needing to have an object physically placed thereon. The patient wound and patient skin near the wound are spared contact with a ruler, marker, grid, and spared the wound and area near the wound being directly physically worked-on.

12 Claims, 5 Drawing Sheets

(56) References Cited

OTHER PUBLICATIONS

Bunyak et al., "Quantitative Cell Motility for in Vitro Wound Healing Using Level Set-Based Active Contour Tracking", ncbi.nlm.nih.gov, WEB.
I. Ersoy et al., "Cell Spreading Analysis with Directed Edge Profile Edge Profile-Guided Level Set Active Contours", ncbi.nlm.nih.gov, WEB.
"Develop for 2 Amazing Cameras" software.intel.com, WEB.
Tony F. Chan, "Active Contours Without Edges", IEEE Transactions on Image Processing, vol. 10, No. 2, Feb. 2001, pp. 266-277.
"Mckesson Wound Measuring Device", vitalitymedical.com, WEB.
Damir Filko et al., "Detection, reconstruction and segmentation of chronic wounds using Kinect v2 sensor", Elsevier, Procedia Computer Science 90(2016), pp. 151-156.
Robin Wasjo, "Object Recognition and Segmentation of Wounds", Department of Informatics, University of Oslo, Maste's Thesis Spring 2015, Feb. 1, 2015.

* cited by examiner

TOUCHLESS WOUND MEASUREMENT, WOUND VOLUME MEASUREMENT, AND OTHER WOUND MEASUREMENT

FIELD OF THE INVENTION

The invention relates to medical technology in support of wound care, and more particularly, wound measurement technology.

BACKGROUND OF THE INVENTION

Medical treatment of a patient with a wound typically calls for assessment of wound sizes, repeated over time to provide an indication of the patient's progress.

An example of a commercially available wound measuring device is sold by McKesson, 5×7 inch, in a form of a disposable clear plastic sheet with a circular, bull's eye grid marked in centimeters and inches, that is placed atop a patient's wound.

A recent advance in wound measurement technology is reflected in Xu, "Wound Measurement on Smart Phones," US 20140088402 published Mar. 27, 2014.

Generally wound measurement technologies thus far have incorporated an object, or objects, physically placed onto a patient near the wound. However, needing to physically place something onto a patient has at least the inherent disadvantage from the issue of sterility of any object being placed onto or near the patient's wound. Further, when a plastic sheet, marker object, etc. is placed atop or near the wound, the used object must undergo proper disposal. Also, placing measuring devices or marker objects atop, or near, a patient wound can be associated with patient discomfort or pain. Consequently, there remain unmet needs for improvements in wound measurement technology.

SUMMARY OF THE INVENTION

The invention aims to carry out wound measurement but without putting a ruler, grid, marker or other object onto a patient atop, or in a vicinity of, the wound. An object of the invention is wound measurement but with disuse of a ruler, grid, marker or other object physically contacting the patient wound or the patient's skin near the wound.

In a preferred embodiment, the invention provides a method of measuring a wound on a patient, comprising the following steps: scanning, by a 3D camera, the wound by which a wound image is acquired by the 3D camera; and, processing the wound image acquired by the 3D camera, and thereby computing a Wound Volume Measurement, without any ruler, grid, or marker having been placed on or near the patient.

The invention in another preferred embodiment provides a touchless method of wound measurement, consisting of steps that are touchless relative to a patient having a wound to be measured, wherein a Wound Volume Measurement is computed of the wound without any RGB data processing having been performed and without any other color-information data processing having been performed.

DETAILED DESCRIPTION OF A PREFERRED EMBODIMENT OF THE INVENTION

The inventive technology is used, in connection with a patient who suffers from a wound, to compute a Wound Volume Measurement, advantageously without any ruler, grid, marker (or such physical object) needing to have been placed on, or near, the patient (particularly, onto the patient wound or onto skin near the patient wound). We sometimes refer herein to "touchless", by which we mean that the patient's wound and the wound's environ is untouched by any ruler, grid, marker, 3D camera, frame enclosure holding a 3D camera, or the like.

The invention is useable for computing a Wound Volume Measurement for a patient wound that is susceptible of imaging by a 3D camera, such as a dermal wound. The invention mainly contemplates a human patient, but also can be used in connection with a veterinary patient.

Examples of a 3D camera for use in practicing the invention are, e.g., Intel® RealSense™ 3-D camera; Orbbec® Astra™ 3-D camera; ZED™ stereo 3-D camera by Stereolabs.

A requisite step is a step of scanning, by a 3D camera, the wound by which a wound image is acquired by the 3D camera. Most preferably, the scanning step is performed without the 3D camera coming into physical contact with the patient.

After the wound image has been acquired by the 3D camera, a step is performed (by a computer or other machine) of processing the wound image acquired by the 3D camera, and thereby computing a Wound Volume Measurement, without any ruler, grid, or marker having been placed on or near the patient.

Example 1

In this inventive example, method steps are performed as follows:
- prompting a first user to perform wound-scanning by operating a 3D camera to scan the wound and obtain a wound image, wherein the wound image has a wound edge;
- saving the wound image to an OBJ mesh file, with texture;
- reading the OBJ mesh file;
- prompting a second user to point to the wound edge with the mouse or pointer at a first point P1;
- getting 3D location of the first point P1 where the mouse was pointed; prompting the second user to point to a next point Pn on the wound edge;
- getting 3D location of the point Pn where the mouse was pointed, and, if a total of clicked points is greater than 2, adding the triangle formed by the most recent 3 clicked points to a Wound Surface value;
- displaying a triangle T1;
- pressing a predetermined key, or clicking a preset button, to calculate the wound volume;
- for each triangle T1 . . . Tn, calculating a surface area of the triangle for total Wound Surface;

calculating each edge point 3D distance, thereby getting average Surface Distance; calculating an area surrounded by edge points;

dividing the area surrounded by edge points into a grid, and getting 3D location for each grid joint;

calculating average distance of each grid joint, thereby getting an average Wound Distance;

subtracting average Wound Distance from average Surface Distance, to obtain average Wound Depth;

obtaining Wound Volume by multiplying average Wound Depth by total Wound Surface.

Example 1A

In this example, Example 1 is performed, using Meshlab. The step of reading the OBJ file is performed using MeshLab app. The step of getting 3D location of the first point P1 comprises calling FindNearestMeshPoint to get the 3D location of point P. The step of getting 3D location of the point Pn comprises calling FindNearestMeshPoint to get the 3D location of point Pn. The step of displaying the triangle T1 comprises calling OpenGL function in MeshLab to display the triangle T1. The step of displaying the triangle Tn comprises calling OpenGL function in MeshLab to display the triangle Tn. The step of dividing the area surrounded by edge points into a grid and getting a 3D location for each grid joint comprises calling FindNearestMeshPoint in MeshLab to get 3D location for each grid joint.

Example 1B

In this example, Example 1 is carried out, and the second user who operates the mouse also being the first user who operated the 3D camera.

Example 1C

In this example, Example 1 is carried out, and the second user who operates the mouse is someone other than the first user operated the 3D camera.

Example 1D

In this example, Example 1 is performed such that exactly 3 mouse-clicked points are collected by prompting the user's clicking on the wound edge.

Example 1E

In this example, Example 1 is performed wherein more than 3 mouse-clicked points are collected by prompting the user's clicking on the wound edge.

Example 1F

In this example, Example 1 is performed, wherein a number of mouse-clicked points collected by prompting the user's clicking on the wound edge is in a range of 3-10 mouse-clicked points.

Example 1G

In this example, Example 1 is performed wherein the step of pressing to calculate wound volume comprises pressing "G" in Meshlab.

Example 2

An imaging device according to this inventive Example is useable to acquire 3D images that can be subjected to computer processing steps.

Example 2.1

An imaging device was constructed as follows, according to a novel algorithm that consists of two main parts: wound detection and wound measurement.

The algorithm applies to a 3D model of a human body part containing a wound. The 3D model is obtained from a scan performed by an inventive application. The algorithm is not applied directly to the 3D model. Instead, the generated 3D model is rendered with camera parameters providing a good view of the wound (typically perpendicular to the wound or to the body part where the wound is), from which the algorithm acquires the Z-buffer (depth map) Z, calculated by the rendering process and the corresponding 4-by-4 projection matrix P as an input. The rendering process is based on OpenGL API (The Industry Standard for High Performance Graphics), and hence we use here the OpenGL terminology.

In addition, the algorithm gets a user defined outer-wound contour C as a hint for the wound location.

The algorithm does NOT use any color information.

Wound Detection

The following steps are performed.

1. Convert the Z-Buffer Z to the Depth Image D.

The conversion is given by:

$$D(i, j) = \frac{P(3, 4)}{2Z(i, j) - 1 + P(3, 3)}, (i, j) \in R,$$

where $R = \{1, \ldots, m\} \times \{1, \ldots, n\}$, m is a number of rows and n is a number of columns in Z and D.

2. Define a Region of Interest U for Wound Detection.

We include in U a $(i,j) \in R$ laying inside C, except border pixels (i=1 or i=m or j=1 or j=n) and except pixels which depth is too close to the far parameter of P, i.e., $$D(i,j) > (1-\alpha)P(3,4)/(P(3,3)+1),$$

where α is a small positive constant.

3. Wound Capping.

We reconstruct skin surface S over the wound in order to enhance wound appearance by subtracting S from D.

(a) Calculate the First Approximation.

Since wound boundary is unknown yet, we start from the region U. Namely, we solve the following discrete Laplace equation with respect to S $$4S(i,j) - S(i-1,j) - S(i+1,j) - S(i,j-1) - S(i,j+1) = 0$$

if $(i,j) \in U$, and $$S(i,j) = D(i,j)$$

if $(i,j) \in R \setminus U$.

(b) Iteratively Raise the Capping if Required.

There is a possibility that the surface S is situated below the wound boundary. In this case S has to be raised. Let h be a maximum value of S−D. If, for some small tolerance threshold δ>0 h>δ, then we find all pixels $(i,j) \in U$ such that $$S(i,j) - D(i,j) \geq h - \delta.$$

Assuming that these pixels are mostly (up to the threshold δ) outside the wound we redefine the region U by excluding these pixels from it. We return to the steps (3a) and (3b) with the updated region U. We proceed in this way until h≤δ or maximal allowed number of iterations is reached.

4. Detect a Wound.

To detect a wound we apply Chan-Vese algorithm (see T. Chan and L. Vese, Active contours without edges. IEEE Trans. Image Processing, 10(2):266-277, February 2001) to the difference F=D−S. The Chan-Vese approach is to find among all 2-valued functions of the form $$\phi(i,j) = \begin{cases} c_1 \text{ if } (i,j) \in W, \\ c_2 \text{ if } (i,j) \in R \setminus W, \end{cases}$$

the one that minimizes the following energy functional, $$\mu \text{Length}(\partial W) + \nu \text{Area}(W) + \lambda_1 \Sigma_{(i,j) \in W} F(i,j) - c_1)^2 + \lambda_2 \Sigma_{(i,j) \in R \setminus W} (F(i,j) - c_2)^2,$$

where ∂W denotes the boundary of W, $\mu > 0$, $\nu \geq 0$, $\lambda_1 > 0$, $\lambda_2 > 0$ are fixed parameters.

Let W, $c_1$ and $c_2$ minimize the energy functional. We interpret W as a set of pixels belonging to the wound.

5. Correct Wound Boundary.

The wound boundary ∂W obtained in (4) is not accurate enough. It is located somewhere on the wound walls, but not necessarily on the top of them. We move it to the top as described below.

Starting from each pixel (i,j)∈∂W we go in the direction orthogonal to ∂W and select a pixel (p(i,j), q(i,j)) located on the top of the wound wall by searching for the maximum value of the directional second derivative of the depth image D. Our intention is to move pixels(i,j) to pixels (p(i,j), q(i,j)), but this operation can break continuity of the wound boundary.

Denote by dist(i,j,A) the euclidean distance from the pixel (i,j) to the set of pixels A. Let $$\Delta(i,j) = \text{dist}(i,j,W) - \text{dist}(i,j,R \setminus W).$$

For any t>0, the set $W_t = \{(i,j) \in R: \Delta(i,j) < t\}$ is an uniform expansion of W with size controlled by t, $W_0 = W$. In order to make this kind of expansion more flexible we replace t with a function T(i,j) which on the one hand has to be close to a constant, and on the other hand has to get values close to dist(p(i,j), q(i,j), W) at the pixels (p(i,j), q(i,j)).

We find T as the solution of the following optimization problem $$\Sigma_{i=2}^m \Sigma_{j=1}^n [T(i,j) - T(i-1,j)]^2 + \Sigma_{i=1}^m \Sigma_{j=2}^n [T(i,j) - T(i,j-1)]^2 + \rho \Sigma_{(i,j) \in \partial W} [T(p(i,j), q(i,j)) - \text{dist}(p(i,j), q(i,j), W)]^2 \to \min,$$

where ρ>0 is a constant parameter. Finally, we declare $$W^* = \{(i,j) \in R: \Delta(i,j) \leq T(i,j)\}$$

as a set of the wound pixels.

Wound Measurements

Formulas for calculating wound volume, maximal depth, area, perimeter, length and width are set forth below. Note that the last 4 measurements are calculated for wound projection onto a plane parallel to the camera image plane.

In order to calculate wound volume we perform capping again as described in (3a) using $W^*$ instead of U. Let $S^*$ be the result. We clamp it as follows $$S^* = \min(S^*, D).$$

Then $$\text{WoundVolume} = \frac{4}{3mnP(1,1)P(2,2)} \cdot \sum_{(i,j) \in W^*} (D(i,j)^3 - S^*(i,j)^3),$$

$$\text{WoundMaximalDepth} = \max\{D(i,j) - S^*(i,j), (i,j) \in W^*\}.$$

Tracing the wound boundary $\partial W^*$ we write down all pixels belonging to $\partial W^*$ as a sequence $(i_1, j_1), (i_2, j_2), \ldots, (i_N, j_N)$. Let Q be the inverse matrix of P and let for each k=1, ..., N, $$X_k = \frac{Q(1,1)x_k + Q(1,4)}{Q(4,3)z_k + Q(4,4)}, Y_k = \frac{Q(2,2)y_k + Q(2,4)}{Q(4,3)z_k + Q(4,4)}, \text{ where}$$

$$x_k = (2/n)(j_k - 0.5) - 1, y_k = -(2/m)(i_k - 0.5) + 1,$$

$$z_k = -P(3,3) + \frac{P(3,4)}{D(i_k, j_k)}.$$

Put, in addition, $X_0 = X_N, Y_0 = Y_N$ and $Y_{N+1} = Y_1$. Then $$\text{WoundArea} = |\Sigma_{k=1}^N X_k (Y_{k+1} - Y_{k-1})|,$$

$$\text{WoundPerimeter} = \Sigma_{k=1}^N \sqrt{(x_k - x_{k-1})^2 + (Y_k - Y_{k-1})^2}.$$

Assuming that a human body orientation is defined by an angle θ, wound length and width are given by WoundLength=max{$X_k$ cos θ+$Y_k$ sin θ,1≤k≤N}− min{$X_k$ cos θ+$Y_k$ sin θ,1≤k≤N}, WoundWidth=max{−$X_k$ sin θ+$Y_k$ cos θ,1≤k≤N}− min{−$X_k$ sin θ+$Y_k$ cos θ,1≤k≤N}.

Example 2.2

Optimal values for algorithm parameters in Example 2.1 are determined by testing the system on phantom wounds and other forms made from plasticine. For α (a small positive constant), 0.01 was chosen.

Example 2.3

In this example, when an inventive device used according to any of Examples 2, 2.1, 2.2, an image was ready to view within 10 seconds of camera operation.

Example 2.4

In this example, when an inventive device was used according of any of Examples 2, 2.1, 2.2, 2.3, after a scan was completed, a 3D image was displayed to a user, and the displayed 3D image was subject to being manipulated by a finger of the user.

Example 2.5

In this example according to Example 2.4, a user manipulated a wound image on screen with the user's finger, including, the user looked behind and under a wound image on screen.

Example 2.6

Figure 1:
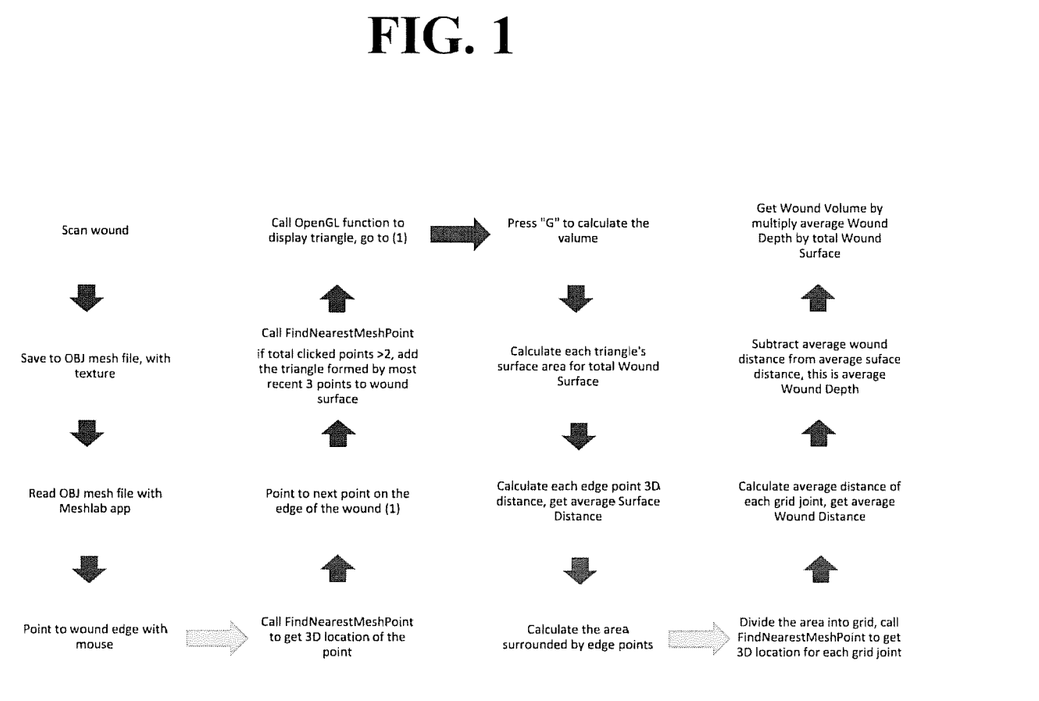
FIG. 1 is a flow chart of method steps in an embodiment of an inventive wound measurement method.
Figure 2:
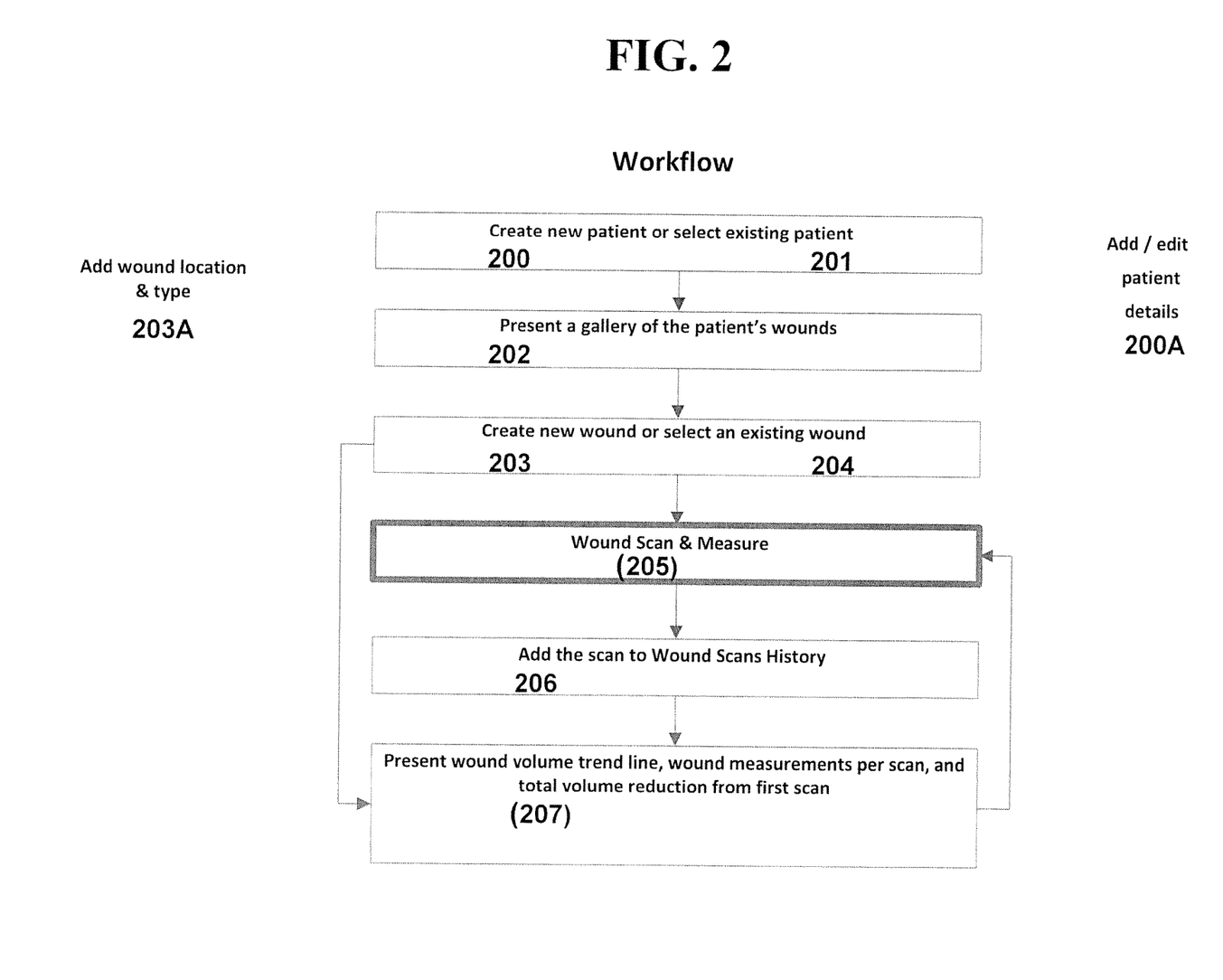
FIG. 2 is a flow chart of method steps in an inventive embodiment of wound measurement technology using computerized records-keeping.

Referring to FIG. 2, in this Example, method steps are performed of: creating 200 a New Patient record or selecting 201 an Existing Patient record; presenting 202 a gallery of the patient's wounds; creating 203 a new Wound record or selecting 204 an existing Wound record; performing Wound Scan & Measurement 205; adding 206 the scan to Wound Scans History; presenting 207 Wound Volume trend line, Wound Measurement Per Scan, and Total Volume Reduction from first scan.

Example 2.6A

Referring to FIG. 2, optionally steps of adding 203A wound location and type (to the Wound Record, and/or adding/editing 200A patient details to the Patient Record, are performed.

Example 2.7 (Wound Scan & Measurement)

Figure 3:
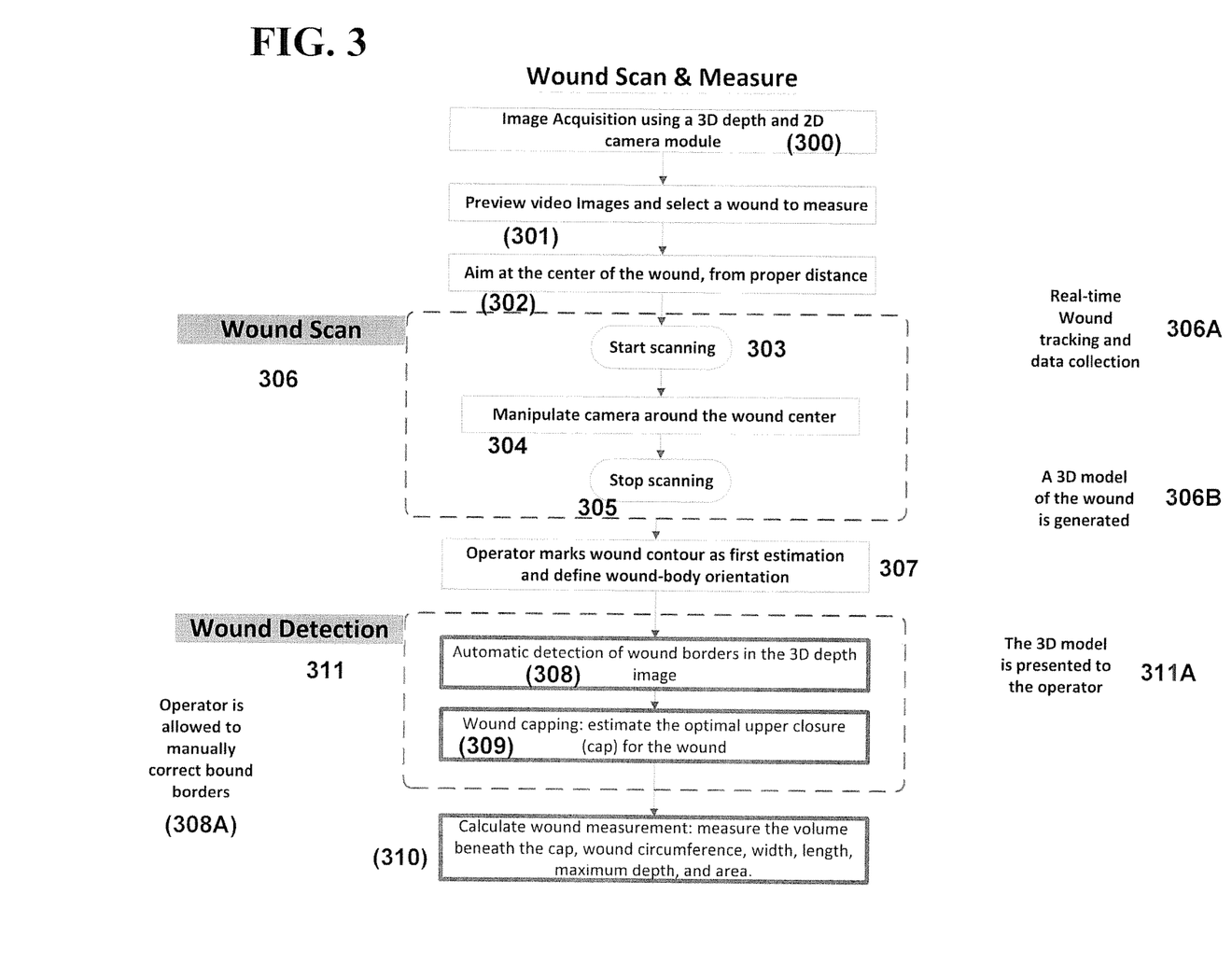
FIG. 3 is a flow chart of method steps in an inventive embodiment of wound scan and measurement.

Referring to FIG. 3, in this Example, method steps are performed of: Image Acquisition 300 using a 3D depth and 2D camera module; previewing 301 video images and selecting a wound to measure; aiming 302 at the center of the wound, from a proper distance; starting 303 scanning; manipulating 304 the camera around the wound center; stopping 305 scanning; a step 307, performed by an operator, of marking a wound contour as a first estimation and defining wound-body orientation; automatic detection 308 of wound borders in the 3D depth image; wound capping 309 (comprising estimating the optimal upper closure (i.e., cap) for the wound); calculating 310 wound measurement (comprising measuring the volume beneath the cap, wound circumference, width, length, maximum depth, and area).

Steps 303, 304, 305 are referred to as Wound Scan 306 steps.

Steps 308, 309, 310 are referred to as Wound Detection 311 steps.

Example 2.7A

Referring to FIG. 3, optionally the operator is allowed to manually correct 308A bound borders.

Example 2.7B

Referring to FIG. 3, optionally real-time wound tracking and data collection are output in an outputting step 306.

Example 2.8B

Referring to FIG. 3, optionally a 3D model of the wound is generated in a generating step 306B.

Example 2.8C

Referring to FIG. 3, optionally the 3D model of Example 2.8B is presented to the operator in a displaying step 311A.

Example 2.8 (Wound Detection)

Figure 4:
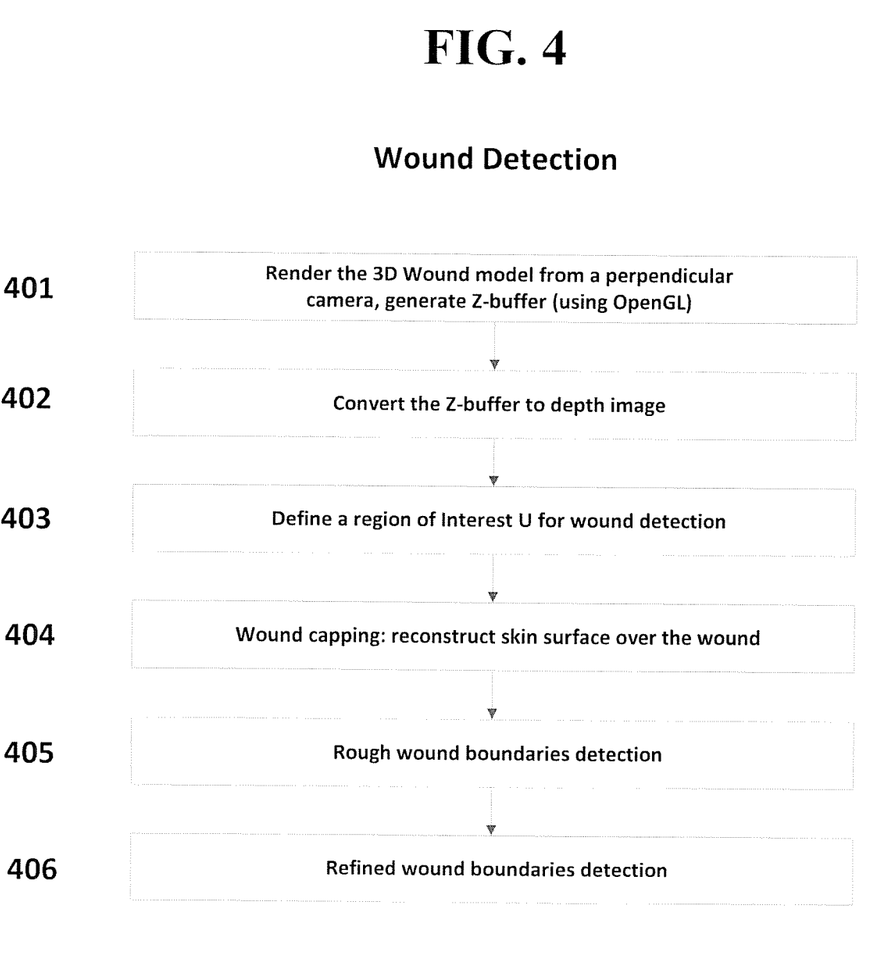
FIG. 4 is a flow chart of method steps in an inventive embodiment of wound detection.

Referring to FIG. 4, in this Example, steps are performed of: a step 401 of rendering the 3D wound model from a perpendicular camera and generating Z-buffer (using OpenGL); converting 402 the Z-buffer to depth image; defining 403 a region of interest U for wound detection; wound capping 404 (comprising reconstructing skin surface over the wound); rough wound boundaries detection 405; and refined wound boundaries detection 406.

Example 2.9 (Wound Measurements)

Figure 5:
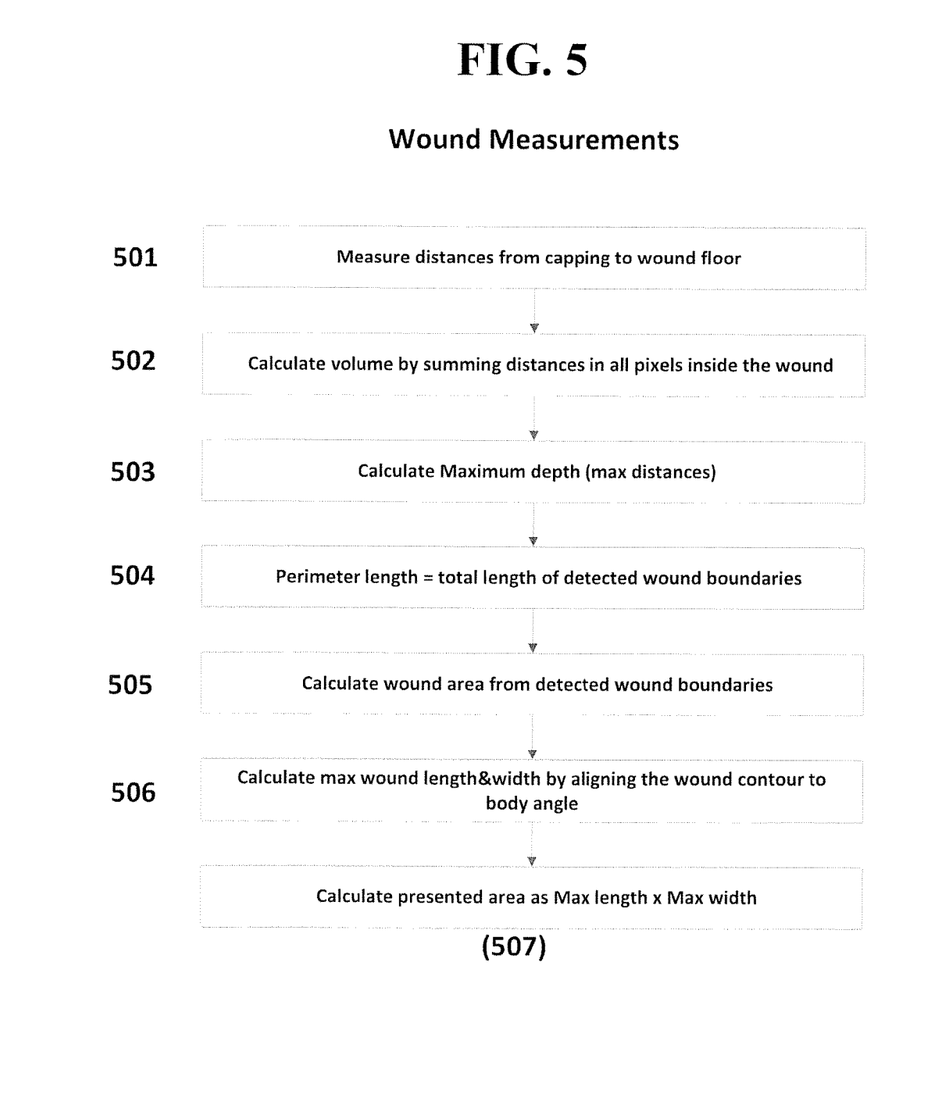
FIG. 5 is a flow chart of method steps in an inventive embodiment of wound measurements.

Referring to FIG. 5, in this Example, steps are performed of: measuring 501 distances from capping to wound floor; calculating 502 volume by summing distances in all pixels inside the wound; calculating 503 maximum depth (max distances); summating 504 perimeter length equaling total length of detected wound boundaries; calculating 505 wound area from detected wound boundaries; calculating 506 max wound length & width by aligning the wound contour to body angle; and calculating 507 presented area as Max length×Max width.

The above described embodiments are set forth by way of example and are not limiting. It will be readily apparent that obvious modification, derivations and variations can be made to the embodiments. The claims appended hereto should be read in their full scope including any such modifications, derivations and variations.

What we claim as our invention is as follows:

1. A method of measuring a wound on a patient, comprising the following steps:
   scanning, by a 3D camera, the wound by which a wound image is acquired by the 3D camera;
   processing the wound image acquired by the 3D camera, and thereby computing a Wound Volume Measurement, without any ruler, grid, or marker having been placed on or near the patient; and wherein the Wound Volume Measurement is computed without any RGB data processing having been performed and without any other color-information data processing having been performed.

2. The method of claim 1, further comprising, using the acquired 3D image, performing a detection algorithm that comprises capping or an interpolation method on a 2-dimensional grid in order to reconstruct a surface.

3. The method of claim 1, further comprising a step of expanding the 3D image.

4. The method of claim 1, further comprising a step of subjecting the 3D image to contrasting.

5. The method of claim 1, wherein the capping is an interpolation method on a 2D grid in order to "reconstruct" a skin surface.

6. The method of claim 1, further comprising a step of solving a Laplace equation with Dirichlet boundary conditions.

7. The method of claim 1, wherein the 3D camera scanning of the wound is touchless scanning.

8. A touchless method of wound measurement, consisting of steps that are touchless relative to a patient having a wound to be measured, wherein a Wound Volume Measurement is computed of the wound without any RGB data processing having been performed and without any other color-information data processing having been performed.

9. The method of claim 8, further comprising performing steps of:
   acquiring an image;
   previewing video images and selecting a wound to measure;
   aiming at the center of the wound;
   at least one Wound Scan step;
   at least one Wound Detection step.

10. The method of claim 9, wherein the at least one Wound Detection step comprises:
    automatic detection of wound borders in the 3D depth image;
    wound capping; and
    calculating a wound measurement.

11. The method of claim 8, further comprising:
    rendering the 3D wound model from a perpendicular camera and generating a Z-buffer;
    converting the Z-buffer to depth image;

defining a region of interest U for wound detection;
wound capping;
rough wound boundaries detection; and
refined wound boundaries detection.

12. The method of claim 8, further comprising:
measuring distances from capping to wound floor;
calculating volume by summing distances in all pixels inside the wound;
calculating maximum depth;
summating perimeter length equaling total length of detected wound boundaries;
calculating wound area from detected wound boundaries;
calculating maximum wound length and width by aligning the wound contour to body angle; and
calculating Maximum length×Maximum width.

* * * * *